(12) United States Patent
Andersen

(10) Patent No.: US 10,106,212 B2
(45) Date of Patent: Oct. 23, 2018

(54) SAFETY AUTOMOBILE WITH RELEASABLE COUNTER-IMPACT PASSENGER COMPARTMENT

(71) Applicant: David C. Andersen, Salt Lake City, UT (US)

(72) Inventor: David C. Andersen, Salt Lake City, UT (US)

( * ) Notice: Subject to any disclaimer, the term of this patent is extended or adjusted under 35 U.S.C. 154(b) by 0 days.

(21) Appl. No.: 15/495,117

(22) Filed: Apr. 24, 2017

(65) Prior Publication Data

US 2017/0225724 A1  Aug. 10, 2017

Related U.S. Application Data

(60) Provisional application No. 62/328,109, filed on Apr. 27, 2016.

(51) Int. Cl.
  *B62D 24/04* (2006.01)
  *B62D 39/00* (2006.01)
  *B60R 21/04* (2006.01)

(52) U.S. Cl.
  CPC .............. *B62D 39/00* (2013.01); *B60R 21/04* (2013.01); *B62D 24/04* (2013.01)

(58) Field of Classification Search
  CPC ........ B62D 24/04; B62D 21/00; B62D 39/00; B60R 21/04
  USPC ................................................. 296/35.2, 35.3
  See application file for complete search history.

(56) References Cited

U.S. PATENT DOCUMENTS

| | | | | | |
|---|---|---|---|---|---|
| 2,256,857 | A | * | 9/1941 | Apostolou | B60G 99/002 180/271 |
| 2,721,616 | A | * | 10/1955 | Rocha | B60G 99/008 105/453 |
| 2,929,637 | A | * | 3/1960 | Papacosta | B60N 2/4221 180/274 |
| 3,162,479 | A | * | 12/1964 | Hewitt | B62D 39/00 180/271 |
| 3,480,291 | A | * | 11/1969 | Hilfiker | B62D 31/006 180/271 |
| 3,695,629 | A | * | 10/1972 | Schlanger | B60R 19/02 180/274 |
| 3,743,347 | A | * | 7/1973 | Shaw | B62D 39/00 296/35.2 |
| 3,831,998 | A | * | 8/1974 | Hewitt | B62D 1/19 180/271 |
| 3,837,422 | A | * | 9/1974 | Schlanger | B62D 39/00 180/274 |
| 3,904,237 | A | * | 9/1975 | Barenyi | B60R 19/26 280/784 |
| 4,170,380 | A | * | 10/1979 | Raitport | B60N 2/4221 267/153 |
| 5,251,911 | A | * | 10/1993 | Blake | B62D 39/00 180/274 |
| 5,738,378 | A | * | 4/1998 | Yazejian | B62D 39/00 180/232 |

(Continued)

*Primary Examiner* — Gregory A Blankenship
(74) *Attorney, Agent, or Firm* — Morriss O'Bryant Compagni Cannon, PLLC

(57) ABSTRACT

The disclosure of the present invention relates to a safety automobile having a releasable passenger pod connected to the vehicle chassis with a counter-impact retention system that is configured to reduce perceived impact and to move the passenger pod away from the impact zone of a crash.

19 Claims, 6 Drawing Sheets

(56) References Cited

U.S. PATENT DOCUMENTS

| | | | | |
|---|---|---|---|---|
| 5,915,775 A * | 6/1999 | Martin | ................... | B62D 24/02 |
| | | | | 296/187.12 |
| 7,185,934 B2 * | 3/2007 | Saeki | ..................... | B62D 39/00 |
| | | | | 296/35.2 |
| 7,721,837 B1 * | 5/2010 | DeVeau | ................. | B62D 39/00 |
| | | | | 180/274 |
| 2001/0026079 A1 * | 10/2001 | Laurent | ................. | B62D 39/00 |
| | | | | 296/187.09 |
| 2003/0025342 A1 * | 2/2003 | Belloso | ................. | B62D 39/00 |
| | | | | 293/132 |
| 2003/0062737 A1 * | 4/2003 | Motozawa | ............ | B60R 22/195 |
| | | | | 296/35.2 |
| 2017/0225724 A1 * | 8/2017 | Andersen | ............... | B62D 39/00 |
| 2018/0001854 A1 * | 1/2018 | Yang | ....................... | B60R 21/02 |

* cited by examiner

SAFETY AUTOMOBILE WITH RELEASABLE COUNTER-IMPACT PASSENGER COMPARTMENT

This patent claims priority to provisional application 62/328,109 filed Apr. 27, 2016, content disclosed therein incorporated by reference.

BACKGROUND

Automobile accidents are a leading cause of death for Americans and others around the globe, and with increased automobile traffic and increased speed limits, the number of fatalities is rising. At the present, automobile safety engineers have focused on methods to dissipate crash energy through an automobile's crumple zones and systems to restrain momentum of the occupants of a vehicle in the event of a crash. Seat belts have been the vanguard safety feature in automobiles for a generation and are rightly credited with saving countless lives. The addition of frontal crash and side curtain airbags has also helped mitigate crash fatalities. However, both systems have limitations and may also become a contributing source of injury.

Seat belts when installed around a user are configured with a gear and pawl mechanism with allows a user to extend the belt and move within the seat at a moderate rate of speed. However, in the event of a crash, the seat belt will lock into a rigid configuration and restrain the user against the crash energy. In this situation it is common that the seat belt straps will cause bruising, possible broken ribs, internal injuries and in some cases even broken vertebrae. Air bags provide a less rigid restraint when deployed but again they have limitations which can cause injury. In the event of a crash, in order for an air bag to be fully deployed before the passenger strikes the bag, it must inflate very rapidly, to such an extent that the front of the air bags will be traveling a speed approaching 200 MPH. In cases where the passenger collides with the air bag before it is fully deployed, the force of deployment can be transferred to the passenger and again can break ribs or some cases cause a broken neck, resulting in paralysis or death. Also as air bags are deployed by the explosive charges, in many instances the inflation of the air bag will be accompanied by an open flame front which may burn the hands, arms and face of the passenger. Currently there are issues with the explosive charges from air bags creating shrapnel from the casing or packaging and again causing serious injury and/or death. These elevated risks from air bags may be justifiable in the event of a high speed crash. However, air bags often deploy during relatively harmless bumps and "fender benders" and ultimately cause serious injury in events where there was little or no risk to the passengers.

What is needed is a passenger safety system that does not act against or restrain the passenger but still reduces the destructive forces transferred to the passenger. It may be used in conjunction with less restrictive seat belts or air bags having a moderated explosive charge.

SUMMARY OF THE INVENTION

One embodiment of the present invention or SAFETY AUTOMOBILE WITH RELEASABLE COUNTER-IMPACT PASSENGER COMPARTMENT comprising an automotive chassis having the drive train components and fuel system, fuel cell or batteries integrated into the chassis, the chassis including a receiver tub area for a passenger pod, a passenger pod configured to releasably attach into the receiver tub. All vehicle control components are included in the passenger pod, including, steering, shifting, acceleration and braking as well as control for all electrical lighting and indicators. The passenger pod includes seating for one or more passengers and will include moderated internal restraint systems including, but not limited to, seat belts, front air bags and side air bag curtains. It is contemplated that the external structure of the passenger pod will be constructed using impact resistant and absorbing composite materials such as carbon fiber, Kevlar and fiberglass. The passenger pod may also include rigid or semi-rigid foam fillers to facilitate impact and noise reduction. The external structure of the passenger pod may also include metal components or structural supports such as steel, aluminum and titanium as required. The steering column of the passenger pod is collapsible to further protect the vehicle operator.

In one embodiment of the present invention the passenger pod is releasably secured into the receiver tub using a mechanical engagement such that during normal operation including, bumps or rough road conditions and in the event of a minor collision, the passenger pod will remain securely engaged with the chassis. However, in the event of a more severe collision, the mechanical engagement will perform a calibrated release and allow the passenger pod to separate from the vehicle chassis. The release of the passenger pod from the chassis will dissipate a portion of the collision or crash energy and prevent this energy from being transferred to the vehicle passengers. It is contemplated that a first embodiment of the releasable mechanical engagement comprises a plurality of spring actuated rams attached to the chassis, each ram having a release surface which is configured to engage a reciprocal surface on the passenger pod. In the event of an impact, weight from the passenger pod will compress the springs and allow the passenger pod to move free from the vehicle chassis.

In another embodiment of the mechanical engagement it is contemplated that a plurality of compressible gas filled rams are used in lieu of the spring actuated rams.

In yet another embodiment of the mechanical engagement the passenger pod is attached to the vehicle chassis using frangible couplings designed to break away or shear during a high impact event. The frangible couplings may be constructed using material such as a mild steel, aluminum or may be an elastomeric material such as rubber or urethane.

In yet another embodiment the of the mechanical engagement, the passenger pod may be attached to the vehicle chassis using a shear membrane or a plurality of membranes that are configured to separate at a controlled rate during the event of a crash. The restraining force of the mechanical engagement may be adjusted in each embodiment. It is contemplated that the force of the mechanical engagement of a spring mechanism can be adjusted by choosing springs having a higher or lower compression rating or a spring may be adjusted by compressing or releasing the spring using a compression ramp mechanism or a threaded section on the ram and a ring nut.

When using a gas filled rams, pressure can be adjusted by adjusting the gas pressure within the ram body. Each of the frangible embodiments can be adjusted by choosing harder or softer metals or by altering the shear cross section of the metal coupling. The shear force of an elastomeric coupling is adjustable by varying the durometer of the material or again by varying the shear cross section. When using a shear membrane it is contemplated that shear force can be varied by choice of adhesive or adhesive force between the membranes.

One embodiment of the present invention includes one or more pneumatic or hydraulic rams incorporated into the rear portion of the vehicle chassis. The rams are used to transfer energy from a rear-end crash into the release mechanism of the passenger pod and allow the passenger pod to be released from the chassis and be moved out of the impact zone.

In one embodiment of the present invention the passenger pod is secured to the vehicle chassis using a counter-impact retention system. In the event of a crash and the subsequent release of the passenger pod from the vehicle chassis it may be desirable to maintain the passenger pod in proximity with the vehicle chassis.

In one embodiment of the present invention the passenger pod is attached to the vehicle chassis using one or more tethers. It is contemplated that the tethers are comprised of cables, straps or cords. It may be desirable that the tethers are stretchable to allow for further dissipation of crash energy. In one embodiment the tethers may be a high tensile material having an open weave to allow for stretch, or the tethers may be in a spring or wound configuration to allow energy dissipation.

In another embodiment the counter-impact retention system may comprise a plurality of tethers attached to the passenger pod and connected to a near instantaneous retraction system mounted at the rear of the vehicle chassis.

In yet another embodiment the retraction system includes one or more cable drums mounted to a central axle with a high tension counter-balance spring assembly. In the event of a frontal crash and the release of the passenger pod, the retraction system will move the passenger pod backwards on the chassis creating counter-impact velocity and moving the passenger pod out of the crash impact zone.

In another embodiment the counter-balance spring can be supplemented using a computer controlled high speed electric motor, improving the counter-impact retraction.

In still other embodiments the retraction system can be one or more high speed computer controlled electric motors which control each retraction cable independently. In such an embodiment it is contemplated that in the event of a frontal crash each high speed motor will retract the cables at substantially the same rate of speed to offset the sudden change in velocity. However, in the event of a partial frontal impact or in the event of a side impact, it is contemplated that the retraction motors will have the capacity to retract both of the cables and play out cable as necessary to stabilize forces felt within the passenger compartment. In another embodiment the retraction cables may also have an independent brake system to help control both the attitude and movement of the passenger compartment.

It is contemplated that the counter-impact retention system may also utilize a plurality of pressurized air cylinders or explosively charged cylinders which are used to rapidly move the passenger pod backward on the vehicle chassis in the event of a crash and counteract a sudden velocity change.

In each embodiment of the present invention the vehicle chassis will include crush zones or crumple zones in order to absorb crash energy.

Innovations in the Safety Pod Interior

The instrument and control module in the passenger pod is collapsible and adjustable. The instrument and control module and the glove box/airbag modules are interchangeable in the manufacturing process so that you may work for international sales without multimillion dollars in tooling normally required in order to incorporate changes required to answer those markets. The seats have computer touch controlled panels, inflatable hexagonal segments to provide ideal side and lumbar support. The standard features for the safety pod include, pop-up 17 inch map display, side and front/rear airbags, seatbelts, video displays on the back of the headrests, large headrests and symmetrical climate control vents and gearshift handle bands located in the center console module.

The Cable Retraction Mechanism

The safety pod concept relies on cables which are attached to the bottom forward portion of the safety pod and connected to the take-up reels. Once the safety pod has broken loose from the frame via hydraulic or pneumatic actuation, it is then propelled out of the crash zone by the forces of a torsional spring and a high-speed electric motor or motors. In some cases the safety pod is moved asymmetrically out of the crash zone in cases of side or rear impacts. The discrepancy of cable lengths required to do this is facilitated by a differential on the electric motor and torsional spring driveshaft which is computer-controlled. The asymmetrical take-up of cables is also facilitated with the use of cable brakes on the cable take-up reels.

The aesthetic design for the automobile safety car is completely unique. The main design feature is that there are flowing design lines and form factors which accentuate the prominence of the safety pod. They extend from around the windshield and returning to accentuate the front wheel portion of the design. On the back portion of the car the reverse happens with flowing lines and form factor extending from the wheel well around the wheel to the rear window of the vehicle.

BRIEF DESCRIPTION OF DRAWINGS

The following description of the embodiments can be understood in light of the Figures which illustrate specific aspects of the embodiments and are part of the specification. Together with the following description, the Figures demonstrate and explain the principles of the embodiments. In the Figures the physical dimensions of the embodiment may be exaggerated for clarity. The same reference numerals or word descriptions in different drawings represent the same element, and thus their descriptions may be omitted.

DETAILED DESCRIPTION OF DRAWINGS

Figure 1A:
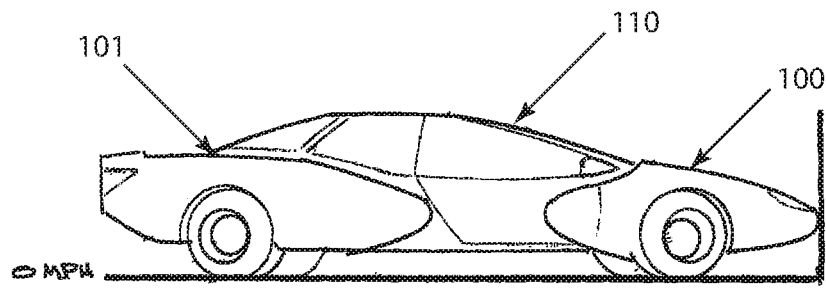
FIGS. 1A through 1H the safety automobile showing passenger pod detachment during a frontal impact at different speeds, FIGS. 2A and 2B the safety automobile showing passenger pod detachment in rear impact crashes, FIG. 3 the safety automobile showing passenger pod detachment in a side impact, FIG. 4A one embodiment of a counter-impact retention system of the present invention, FIG. 4B one embodiment of a counter-impact retention system cable arrangement.
Figure 1B:
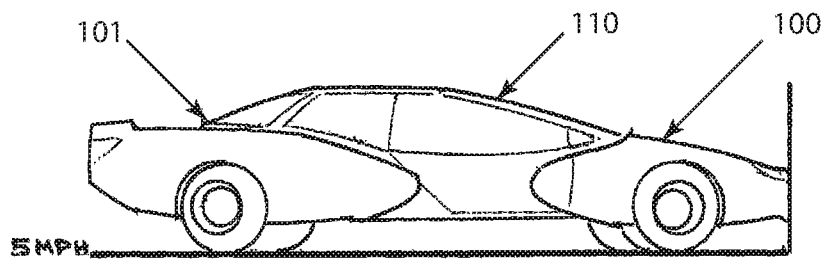
Figure 1C:
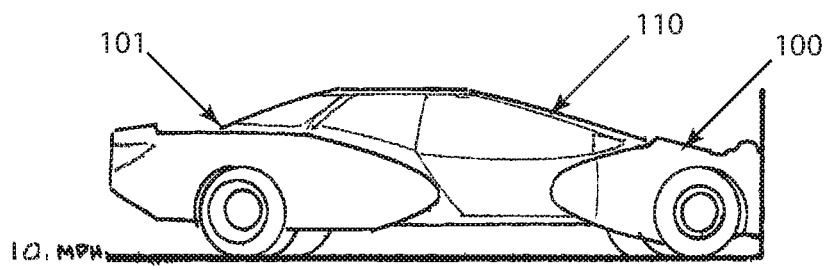
Figure 1D:
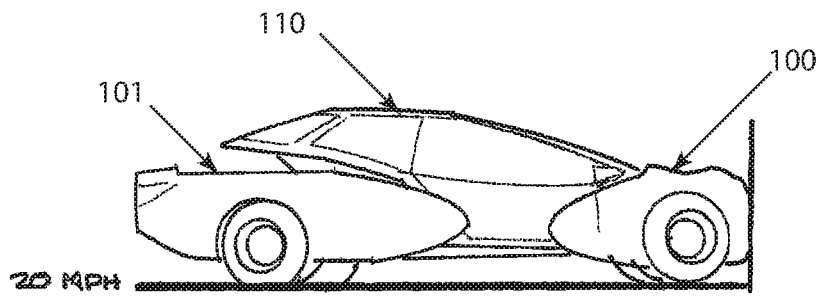
Figure 1E:
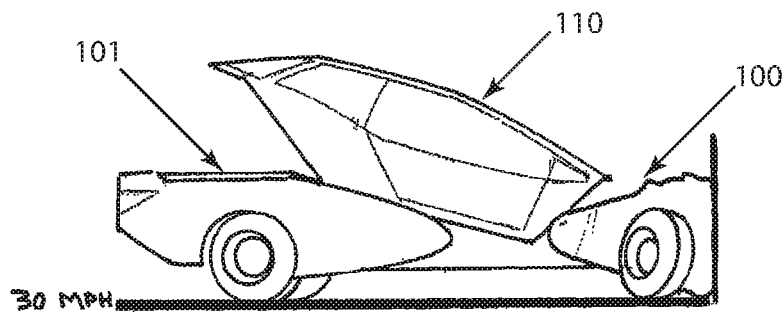
Figure 1F:
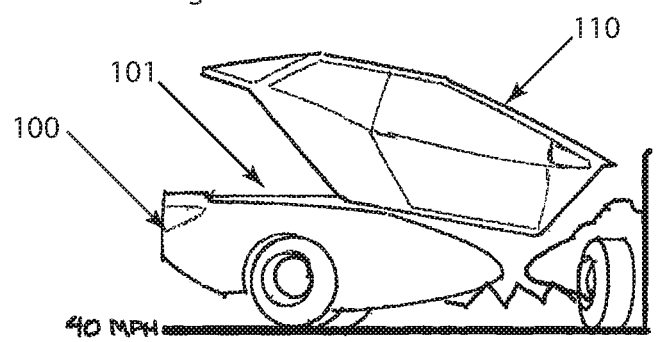
Figure 1G:
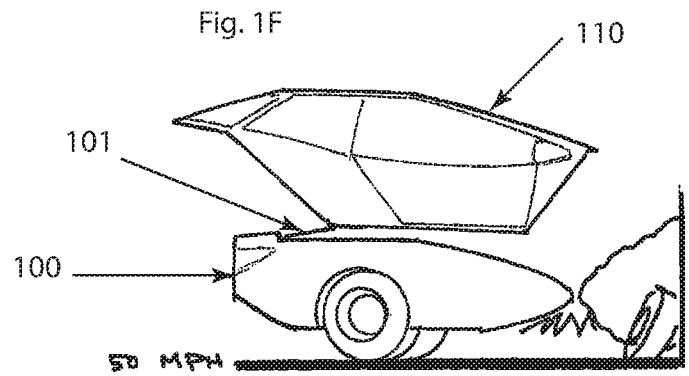
Figure 1H:
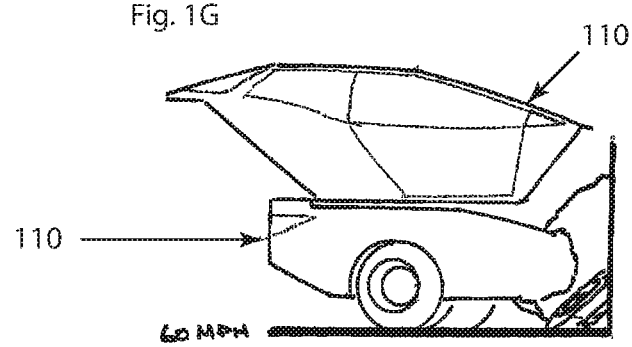
Figure 2A:
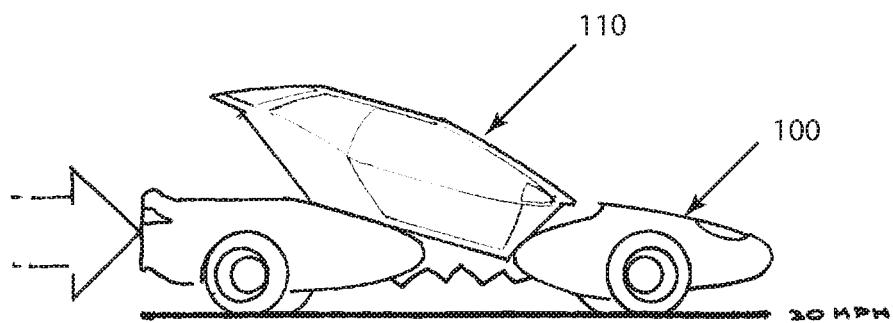
Figure 2B:
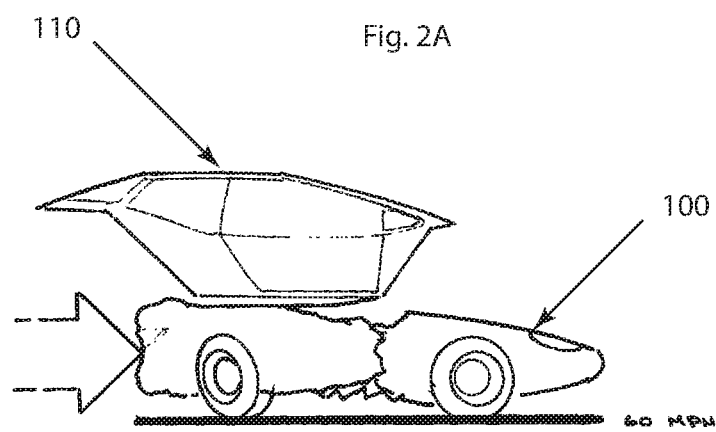
Figure 3:
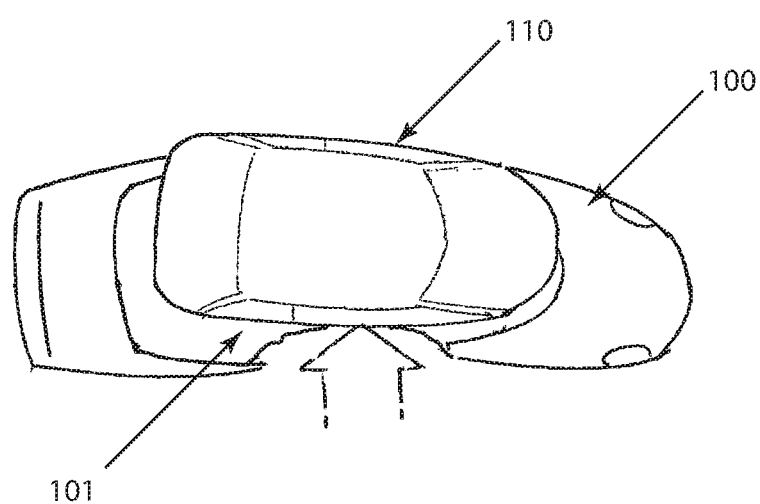
Figure 4A:
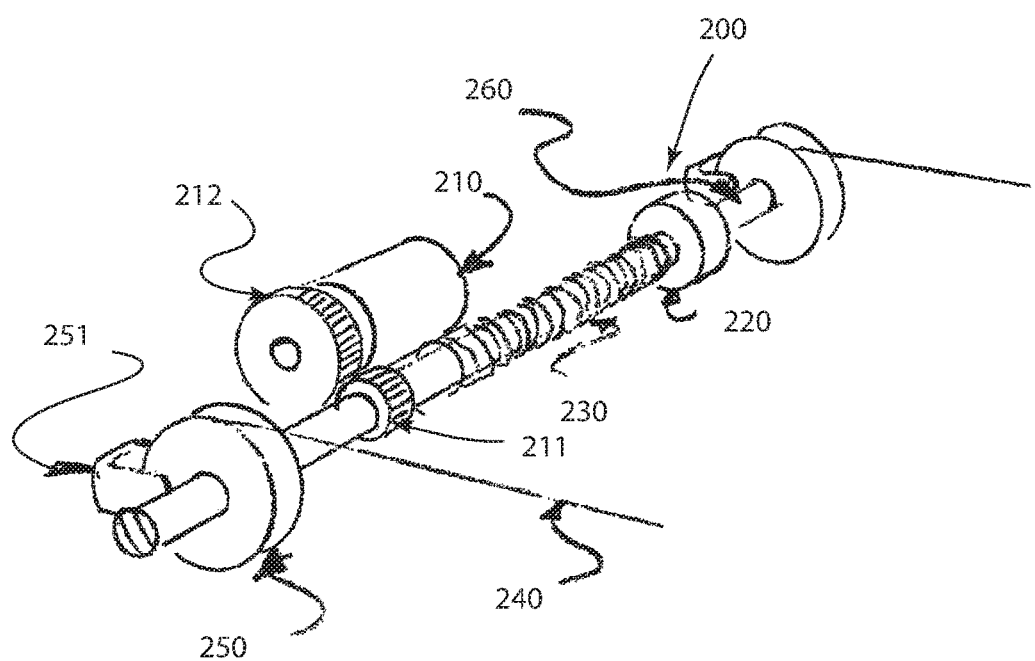

The safety automobile 100 is a revolutionary design which allows vehicle occupants to suffer little or no injuries in a 60 mph frontal impact into a barrier or other vehicle as depicted in FIGS. 1A through 1H. This design also allows few or no injuries from a similar speed impact to the rear or side impact as depicted in FIGS. 2 and 3. This is accomplished by utilizing a carbon fiber safety pod 110 which encloses the occupants of the vehicle shown in both FIGS. 1 and 2. It should be noted that all of the occupants of the vehicle still must wear seatbelts and are protected by airbags for both front and rear passengers. The safety pod 110 is not ejected from the rest of the vehicle in low-speed impacts of less than 10 miles an hour. In impacts higher than 10 mph the safety pod 110 breaks away from a receiver tub 101 much like a ski boot breaks away from a ski when sufficient forces are applied to the ski-like binding. The safety pod 110 is then propelled out of the crash zones with the utilization of cables 240 (FIGS. 4A and 4B) which are attached to the base of the safety pod 110. As shown in FIG. 4A, the cables 240 are coiled around a shaft 260 which is energized by a torsionally coiled spring 230, an electric motor 210, and cable brakes 251 controlled by sensors and on-board computers. In a side impact crash, sensors control the rate of the release of the cable 240. In front and rear collisions this allows the safety pod 110 to be moved out of the area of collision damage. In the case of a side impact collision the cables 240 are utilized to keep the safety pod 110 from being jettisoned too far away from the remaining vehicle components. In all cases the remnants of the non-pod segments of the vehicle 100 are left behind to absorb the impact with another vehicle or barrier while the high-strength carbon fiber construction of the safety pod 110 along with seatbelts and airbags protect the vehicle occupants.

In this approach, the movement of the passenger pod 110 is unique, as shown and described FIGS. 1A through 3. The safety pod 110, in conjunction with the receiver tub 101, guides the passenger pod 110 up and out of the crushed zone, utilizing the rest of the vehicle 100 to collapse and absorb the crash energy. Motion induced by the counter-impact mechanism 200, may in some situations, increase the G forces acting on the passengers, however they are protected from injury by headrests, seatbelts, airbags and a collapsible steering/brakes/accelerator and instrument module.

Figure 5:
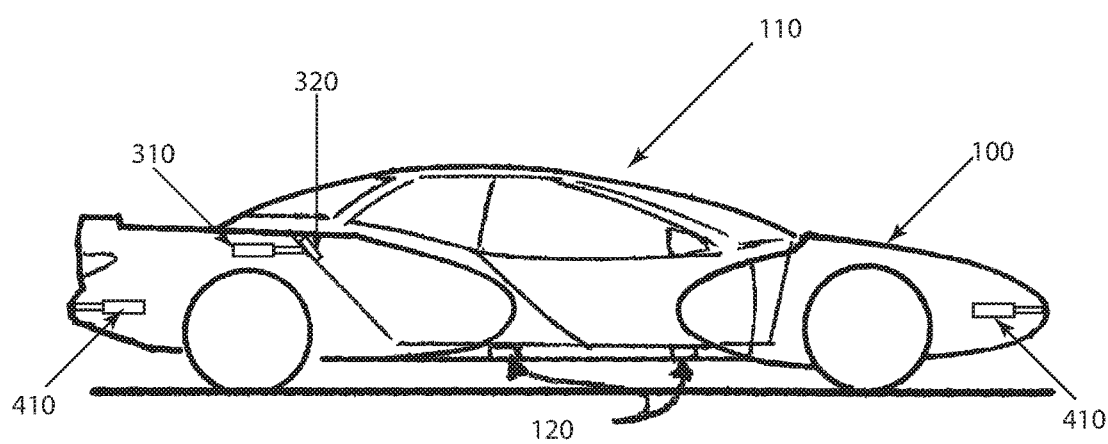
FIG. 5 is a side view of the safety automobile, and, FIG. 6 is perspective view of the operator's consul.

In one embodiment, the energy absorbed from the front and rear shock absorbers 410 would create a hydraulic or pneumatic reaction that would break the passenger pod 110 free of its ski binding like mounts or attachment mechanisms 310 to the chassis in FIG. 5. The hydraulic or pneumatic piston has a pressure valve that senses a sufficient impact to cause the attachment mechanisms 310 to disengage. It is also contemplated to utilize dynamic sensors to electronically deactivate the attachment mechanisms 310. The passenger pod 110 may also be attached within the receiver tub 101 using a plurality of frangible couplings 120.

Figure 4B:
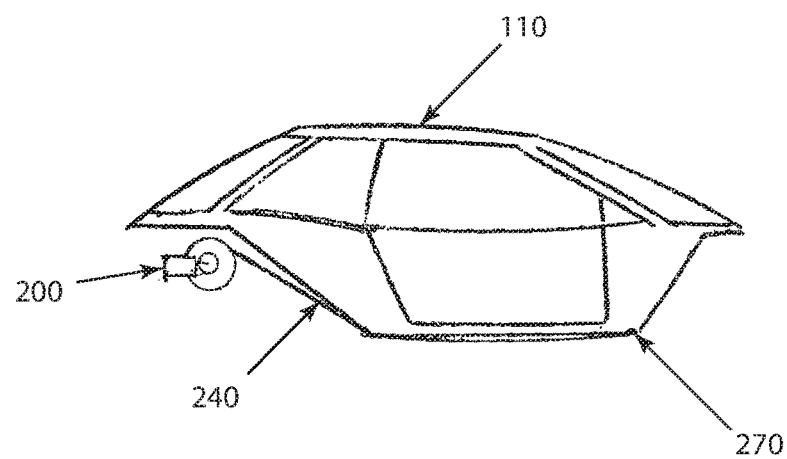

FIGS. 4A and 4B detail the counting impact system 200 including a drive-take up motor 210, having a pinion gear 212 engaged with reciprocal gear 211 fixed to shaft 260. A counter-balance spring 230 and differential 220 are used to supplement take-up power of the drive motor 210. Each cable reel 250 can be independently slowed using a brake mechanism 251. Take-up cables 240 extend from the reel 250 to an attachment point 270 on passenger pod 110. It is contemplated that in another embodiment, each reel 250 will be controlled by an independent high speed take up motor 210, the balance of the cable 240 tension and length would be controlled using a programmable logic controller.

In another embodiment, cables 240 can be replaced by at least four elastomeric cables which connect from attachment points on the vehicle 100 to at point proximate each of the four corners of the passenger pod 110. The properties of the cable 240 such that they stretch at a controlled rate which will soften impact forces felt inside of the passenger pod 110.

Figure 6:
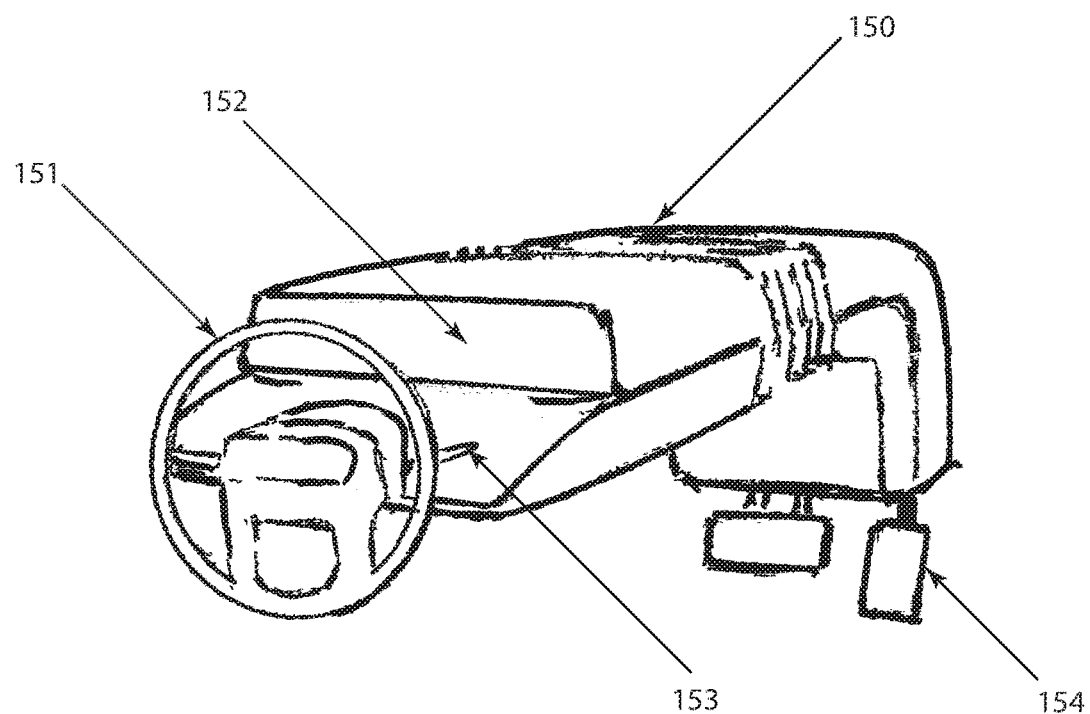

FIG. 6 is one embodiment of the operator console or module 150 within the passenger pod 110. The operator console 150 includes; a steering wheel 151, electronic controls 152, turn signal lever 153 and foot controls 154. The operator console 150 is configured to contain all operator control elements for the vehicle and is configured to be installed or moved, as a module, between the right-hand side and the left-hand side of the passenger pod 110; allowing transportation or sales of the safety vehicle 100 within the various markets having differing traffic laws and preferred operator control configurations.

It is to be understood that the above mentioned arrangements are only illustrative of the application of the principles of the present disclosure. Numerous modifications or alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A safety automobile comprising:
   a chassis, the chassis including,
      a receiver tub, and,
      a counter-impact retaining system,
   a passenger pod, the passenger pod configured to be attached within the receiver tub, and
   a release mechanism between the receiver tub and the passenger pod,
   wherein the counter-impact retaining system is attached from the chassis to the passenger pod and comprises,
      a high tension counter-balance spring,
      at least one cable reel, and
      at least one retention cable running from the at least one cable reel to the passenger pod,
      wherein the counter-balance spring is configured to rapidly wind the at least one retention cable onto to the at least one cable reel.

2. The safety automobile of claim 1, further comprising at least one supplemental high speed electrical motor.

3. The safety automobile of claim 1, further comprising a least one cable reel brake.

4. The safety automobile of claim 1 wherein the release mechanism is a hydraulic ram.

5. The safety automobile of claim 1 wherein the release mechanism is one of a spring-loaded ram and a pneumatic cylinder ram.

6. The safety automobile of claim 1 wherein the release mechanism is at least one frangible coupling.

7. The safety automobile of claim 1 wherein the passenger pod comprises one of at least one of carbon fiber, Kevlar, and fiberglass.

8. The safety automobile of claim 7 wherein the passenger pod includes semi-rigid foam.

9. The safety automobile of claim 1 wherein the chassis having hydraulic rams configured to absorb crash impact forces and to actuate the release mechanism.

10. A safety automobile comprising:
    a chassis,
       the chassis including,
          a receiver tub, and,
          a counter-impact retaining system, a passenger pod,
   the passenger pod configured to be attached within the receiver tub, and
a release mechanism between the receiver tub and the passenger pod,
wherein the counter-impact retaining system is attached from the chassis to the passenger pod,
   the counter-impact retaining system including,
      at least two cable reels,
         a retention cable running from each of the at least two cable reels to the passenger pod,
         a high-speed motor engaged with each of the at least two cable reels,
         the high-speed motor configured to rapidly play-in and play-out the retention cable, and,
         a brake system engaged with each of the at least two cable reels.

11. The safety automobile of claim 10 wherein the counter-impact retaining system includes a high tension counter-balance spring.

12. The safety automobile of claim 10 wherein the release mechanism is a hydraulic ram.

13. The safety automobile of claim 10 wherein the release mechanism is one of a spring-loaded ram and a pneumatic cylinder ram.

14. The safety automobile of claim 10 wherein the release mechanism is at least one frangible coupling.

15. The safety automobile of claim 10 wherein the passenger pod comprises one of at least one of carbon fiber, Kevlar, or fiberglass.

16. The safety automobile of claim 15 wherein the passenger pod includes semi-rigid foam.

17. A safety automobile comprising:
a chassis,
   the chassis including,
      a receiver tub, and,
      a counter-impact retaining system,
a passenger pod,
   the passenger pod configured to be attached within the receiver tub,
   a release mechanism between the receiver tub and the passenger pod, and,
the counter-impact retaining system comprising at least one elastomeric cable attached from the chassis to the passenger pod.

18. The safety automobile of claim 17 wherein the at least one elastomeric cable is one of a steel cable, a Kevlar cable, or a coil spring.

19. The safety automobile of claim 17 wherein the release mechanism comprising at least one of a hydraulic ram, a pneumatic ram, a spring ram or a frangible coupling.

* * * * *